United States Patent
Pfau et al.

(10) Patent No.: US 9,785,273 B2
(45) Date of Patent: *Oct. 10, 2017

(54) TOUCH SURFACE AND MICROPROCESSOR ASSEMBLY

(71) Applicants: Douglas Allen Pfau, Canton, MI (US); Jay Patrick Dark, Canton, MI (US); David Michael Whitton, Saline, MI (US)

(72) Inventors: Douglas Allen Pfau, Canton, MI (US); Jay Patrick Dark, Canton, MI (US); David Michael Whitton, Saline, MI (US)

(73) Assignee: Visteon Global Technologies, Inc., Van Buren Township, MI (US)

(*) Notice: Subject to any disclaimer, the term of this patent is extended or adjusted under 35 U.S.C. 154(b) by 227 days.

This patent is subject to a terminal disclaimer.

(21) Appl. No.: 13/738,148

(22) Filed: Jan. 10, 2013

(65) Prior Publication Data

US 2013/0194210 A1  Aug. 1, 2013

Related U.S. Application Data

(60) Provisional application No. 61/591,477, filed on Jan. 27, 2012, provisional application No. 61/591,454, filed on Jan. 27, 2012.

(51) Int. Cl.
  *G06F 3/041* (2006.01)
  *G06F 3/01* (2006.01)

(52) U.S. Cl.
  CPC ............ *G06F 3/0414* (2013.01); *G06F 3/016* (2013.01); *G06F 2203/04105* (2013.01)

(58) Field of Classification Search
  CPC .................. G06G 3/0414; G06F 3/016; G06F 2203/04105
  USPC .................................................. 345/156–179
  See application file for complete search history.

(56) References Cited

U.S. PATENT DOCUMENTS

| 2006/0284836 A1* | 12/2006 | Philipp ......................... 345/156 |
| 2009/0015549 A1 | 1/2009 | Gelfond et al. |
| 2009/0143142 A1* | 6/2009 | Marcus et al. .................. 463/37 |
| 2010/0156818 A1* | 6/2010 | Burrough et al. ............. 345/173 |

OTHER PUBLICATIONS

Oct. 10, 2013. "Capacitive sensing" wikipedia.org.

* cited by examiner

*Primary Examiner* — Premal Patel
(74) *Attorney, Agent, or Firm* — Dickinson Wright PLLC

(57) ABSTRACT

A method of operating a touch assembly having a touch surface, a haptic feedback device and a switch is provided. The method includes activating the haptic feedback device in response to the switch deactivating. The method also includes monitoring and adjusting the monitoring of the switch in response to the switch deactivating to prevent continued deactivation of the switch by the haptic feedback. A method of operating a touch assembly having a touch surface, a base, a haptic feedback device and a switch is also provided. The method includes sensing the location of a touch force on the touch surface and deactivating a switch in response to the touch force moving the touch surface relative to the base. The method proceeds with transmitting a signal only in response to the location of the touch force being sensed and the at least one switch being in the deactivated configuration.

12 Claims, 3 Drawing Sheets

TOUCH SURFACE AND MICROPROCESSOR ASSEMBLY

CROSS REFERENCE TO RELATED APPLICATION

This application claims the benefit of U.S. Provisional Patent Application Ser. No. 61/591,477 filed Jan. 27, 2012 and U.S. Provisional Patent Application Ser. No. 61/591,454 filed Jan. 27, 2012, the entire content of both applications are hereby incorporated by reference.

BACKGROUND OF THE INVENTION

1. Field of the Invention

The present invention is related generally to touch assemblies and more particularly to a methods of operating touch screen assemblies.

2. Related Art

Touch surface assemblies are becoming increasingly common in cellular telephones, laptop computers, tablet computers, automobiles, etc. In automobiles, touch screens are often used to control, for example, a navigation system; a radio; a heating, ventilation and air conditioning (HVAC) system; etc. Typical touch screen assemblies (which are a subset of touch surfaces) are configured to actuate in response to a person's finger touching or pressing on a transparent surface on the front of the monitor and applying a touch force onto the touch screen assembly.

Typical touch screen assemblies include touch screen monitors which are mounted in the vehicle and remain stationary when pressed and actuate in response to any touch force, even if a person very lightly touches the touch screen monitor. This often leads to inadvertent activations. Some touch screen assembly manufacturers have attempted to solve this problem by monitoring the touch force applied to the surface of the touch screen monitor with a force gauge only actuating the touch screen assembly in response to the touch force exceeding a predetermined threshold. Sometimes, a haptic feedback means is provided to provide some sort of feedback, such as a vibration, to the person who applied the touch force that exceeded the predetermined threshold, thereby alerting the person to a proper activation of the touch screen monitor. The sensors employed in many known touch screen assemblies are high resolution force gauges which are also very costly.

There remains a continuing need for a less costly system that protects against inadvertent actuation by only actuating in response to the touch force when actuation is intended.

SUMMARY OF THE INVENTION

One aspect of the present invention provides for a method of operating a touch assembly having a touch surface, a haptic feedback device and at least one switch. The method includes the step of monitoring the at least one switch to determine whether it is in an activated condition indicating no touch force is being applied to the touch surface or a deactivated condition indicating a touch force is being applied to the touch surface. The method continues with the step of receiving a touch force on the touch surface. The method proceeds with the step of deactivating the switch in response to the touch surface receiving the touch force. The method continues with the step of activating the haptic feedback device to vibrate the touch surface in response to the switch deactivating, i.e. adjusting from the activated configuration to the deactivated configuration.

Another aspect of the present invention includes the step of adjusting the monitoring of the at least one switch in response to the at least one switch being in the deactivated condition to prevent continued deactivation of the at least one switch by the haptic feedback device. In other words, the touch screen assembly automatically prevents the haptic feedback device from activating itself.

According to yet another aspect of the invention, the step of activating the haptic feedback device is for a predetermined duration and the step of adjusting the monitoring of the at least one switch is further defined as delaying monitoring of the at least one switch for a greater duration.

According to still another aspect of the present invention, the step of activating the haptic feedback device is for a predetermined number of cycles and further including the step of counting the cycles from the haptic feedback device and wherein the step of adjusting the monitoring of the switch is further defined as delaying monitoring of the at least one switch until the predetermined number of cycles are counted.

According to a further aspect of the present invention, the step of adjusting the monitoring of the at least one switch is further defined as measuring a signal produced by the switch and only allowing the haptic feedback device to be re-activated after the signal produced by the at least one switch crosses a predetermined threshold.

Another aspect of the present invention is related to a method of operating a touch assembly having a touch surface, a base, a haptic feedback device and at least one switch which is adjustable between an activated configuration and a deactivated configuration and wherein the at least one switch is biased into the activated configuration. The method includes the step of receiving a touch force on the touch surface to move the touch surface relative to the base. The method proceeds with the step of sensing the location of the touch force on the touch surface. The method continues with the step of adjusting the at least one switch to the deactivated configuration in response to the touch surface moving relative to the base. The method proceeds with the step of transmitting a signal only in response to the location of the touch force being sensed and the at least one switch being in the deactivated configuration. A period of time can be determined to prevent additional haptic effects based upon the rate and duration of switch dithering after an initial determination that a haptic effect was activated. This method is advantageous because it prevents unintentional actuations of the touch assembly from either vibrations caused by the haptic feedback device and is adaptive to handle variations in the mechanical parameters that control natural frequency and damping characteristics of the product.

According to another aspect of the present invention, the step of adjusting the at least one switch from the activated configuration to the deactivated configuration is further defined as opening an electrical circuit. The at least one switch could be a force sensitive resistor.

According to yet another aspect of the present invention, the step of adjusting the at least one switch from the activated configuration to the deactivated configuration is further defined as changing the appropriate output from any type of sensor used in this system.

BRIEF DESCRIPTION OF THE DRAWINGS

These and other features and advantages of the present invention will be readily appreciated, as the same becomes better understood by reference to the following detailed description when considered in connection with the accompanying drawings wherein.

DESCRIPTION OF THE ENABLING EMBODIMENT

Figure 1:
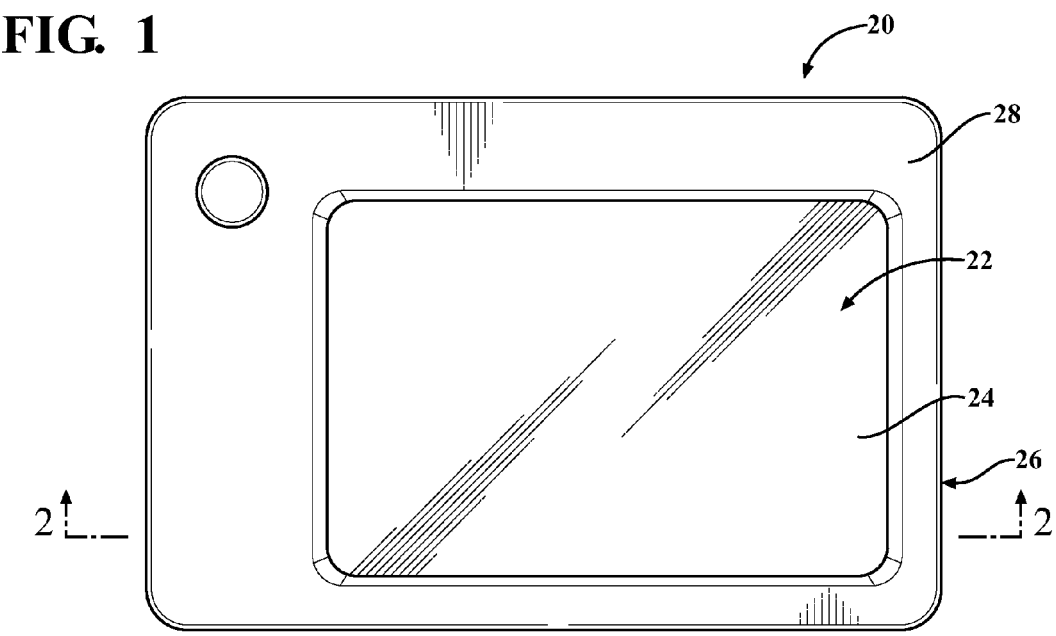
FIG. 1 is a top view of a first exemplary embodiment of the touch assembly.
Figure 2:
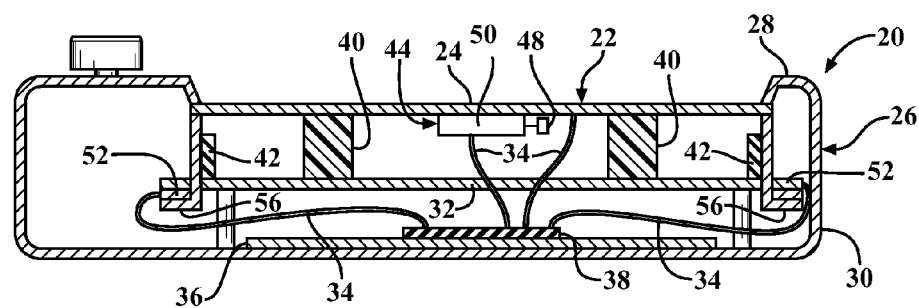
FIG. 2 is a cross-sectional view of the first exemplary embodiment of the touch assembly taken through line 2-2 of FIG. 1 and showing a plurality of switches in an activated condition.
Figure 3:
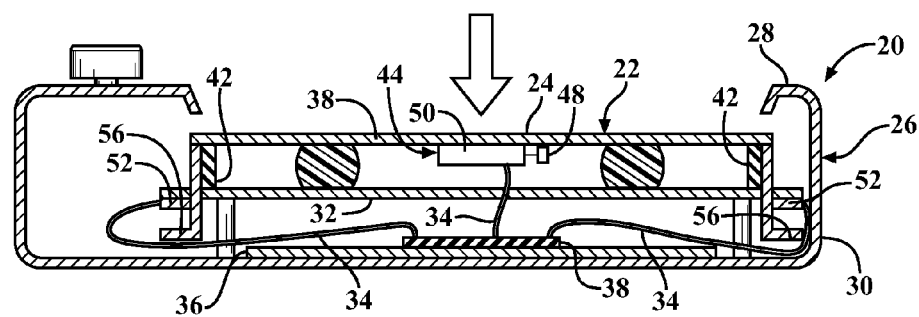
FIG. 3 is another cross-sectional view of the first exemplary embodiment of the touch assembly and showing the plurality of switches in a deactivated condition.

Referring to the Figures, wherein like numerals indicate corresponding parts throughout the several views, a first exemplary touch assembly 20 is generally shown in FIGS. 1-3. As shown in FIG. 1, the first exemplary touch assembly 20 includes a touch screen monitor 22 with an upper surface 24 for receiving a touch force and a housing 26 which contains and supports the touch screen monitor 22. Although it is depicted in the exemplary embodiments as a touch screen monitor 22, it should be appreciated that the touch assembly 20 could have any desirable type of touch surface configured to receive a touch force, i.e. it does not have to be a monitor.

As shown in FIG. 1, in the first exemplary embodiment, the exemplary touch screen monitor 22 and the housing 26 have generally rectangular shapes. The touch screen monitor 22 could be any desirable type of flat panel monitor including, for example, a liquid crystal display (LCD) monitor, a light emitting diode (LED) monitor or a plasma monitor. Although not shown, a grid is preferably disposed on an underside of the touch screen monitor 22 for sensing the location of the touch force. Specifically, the grid is configured to determine coordinates (such as X and Y coordinates) of the touch force on the upper surface 24 of the touch screen monitor 22. The housing 26 may have any desirable shape and may be formed of any desirable material or combination of materials including, for example, polymeric, metallic or composite materials.

Referring now to FIG. 2, in the exemplary embodiment, the housing 26 includes an upper cover 28 (or bezel) and a lower cover 30 which are joined to one another through any desirable means such as fasteners, adhesives, etc. A base 32 is disposed within the housing 26 between the touch screen monitor 22 and the lower cover 30, and a printed circuit (or wire) board (main PCB 36) is disposed within the housing 26 between the base 32 and the lower cover 30. The main PCB 36 includes, inter alia, at least one microprocessor 38 which is in electrical communication with the touch screen monitor 22 for generating signals in response to the touch screen monitor 22 sensing a touch force. As shown, the base 32 of the exemplary embodiment is larger than the touch screen monitor 22 and extends outwardly on opposite sides of the touch screen monitor 22. A plurality of compression springs 40 are disposed between the touch screen monitor 22 and the base 32 to bias the touch screen monitor 22 into a resting position against the upper cover 28 of the housing 26 and spaced from the base 32 by a predetermined distance or gap. In the exemplary embodiment, the compression springs 40 are bodies of an elastic material. However, it should be appreciated that any desirable types of springs including helical springs could alternately be employed. The stiffness, or spring constants, of the compression springs 40 at least partially determines the touch force required to move the touch screen monitor 22 out of contact with the upper cover 28 of the housing 26 and towards the base 32.

A plurality of generally pill-shaped stoppers 42 are mounted to the base 32 in the gap between the base 32 and the touch screen monitor 22. The stoppers 42 have a height that is less than the gap between the base 32 and the touch screen monitor 22 to restrict movement of the touch screen monitor 22 relative to the base 32 and the housing 26. In other words, the stoppers 42 provide a stopping point beyond which the touch screen monitor 22 is restricted from movement. The stoppers 42 are preferably formed of an elastic material to protect the touch screen monitor 22 from damage in response to an excessive touch force. The stoppers 42 are preferably sized to limit movement of the touch screen monitor 22 to approximately 0.25 mm.

A haptic feedback device 44 is coupled to the underside of the touch screen monitor 22 for providing haptic feedback to a person who applies the touch force to the touch screen monitor 22. In the first exemplary embodiment of the touch assembly 20, which is shown in FIGS. 2 and 3, the haptic feedback device 44 is an eccentric rotating mass (ERM) vibrator 44 having an electric motor 50 with a non-symmetrical mass 48 coupled to its output. The ERM vibrator 44 is in electrical communication with the microprocessor 38 on the main PCB 36, which controls the actuation of the ERM vibrator 44. In operation, when the electric motor 50 is actuated by the microprocessor 38, the non-symmetrical mass 48 is rotated to produce a vibration, which is translated into the touch screen monitor 22 and felt by the person to alert the person that the touch screen monitor 22 has been actuated. It should be appreciated that other types of haptic feedback devices could alternately be employed to provide feedback to the person.

The touch assembly 20 also includes a plurality of sensors that are coupled to the touch screen monitor 22 and are configured to sense whether a person has intentionally actuated the touch screen monitor 22. Specifically, the sensors of the first exemplary touch assembly 20 are switches 52 which are biased into an activated configuration and only adjust to a deactivated configuration in response to the touch screen monitor 22 being urged away from the resting position and towards the base 32. The switches 52 are in electrical communication with the microprocessor 38 on the main PCB 36 such that the deactivation of any of the switches 52 signals to the microprocessor 38 to actuate the haptic feedback device 44. The switches 52 could all be wired in series with one another such that deactivation of any one of the switches 52 causes the electrical circuit to open or they could alternately be wired in parallel with one another.

Figure 4:
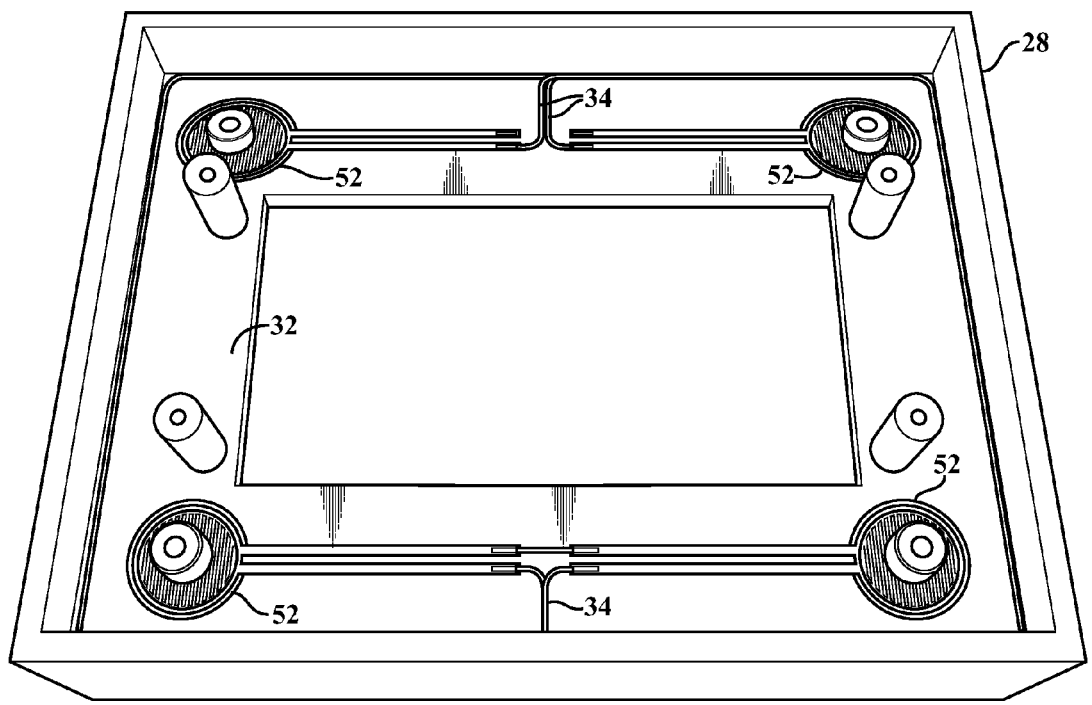
FIG. 4 a perspective elevation view of a base and a plurality of switches of the exemplary embodiment of FIG. 1.

As best shown in FIG. 4, in the first exemplary touch assembly 20, the switches 52, 54 are force sensing resistors (FSRs 52) and are positioned at the four corners of the base 32 on the side of the base 32 opposite of the touch screen monitor (not shown in this Figure). Referring back to FIG. 2, a plunger 56 is operably coupled with the touch screen monitor 22 and extends through the base 32 to the side opposite of the touch screen monitor 22. The biasing of the touch screen monitor 22 away from the base 32 and against the upper cover 28 causes the plunger 56 to be biased against the FSRs 52 with a first force, which causes the FSRs 52 to have a first, very low, resistance. When a touch force is applied to the upper surface 24 of the touch screen monitor 22 to move the touch screen monitor 22, this lowers the force applied by one or more of the plungers 56 against the FSRs 52 and increases the resistance of those FSRs 52. If the plunger 56 separates completely from the associated FSR 52 (such as shown in FIG. 3), the resistance of the associated FSR 52 increases significantly, which effectively opens an electrical circuit. The opening of this circuit triggers the microprocessor 38 to actuate the ERM vibrator 44, which vibrates the touch screen monitor 22 to provide haptic feedback to the person.

In the first exemplary embodiment, the microprocessor 38, ERM vibrator 44 and FSRs 52 are all electrically connected with one another via wires 34. However, it should be appreciated that these components could alternately communicate with one another wirelessly.

Figure 5:
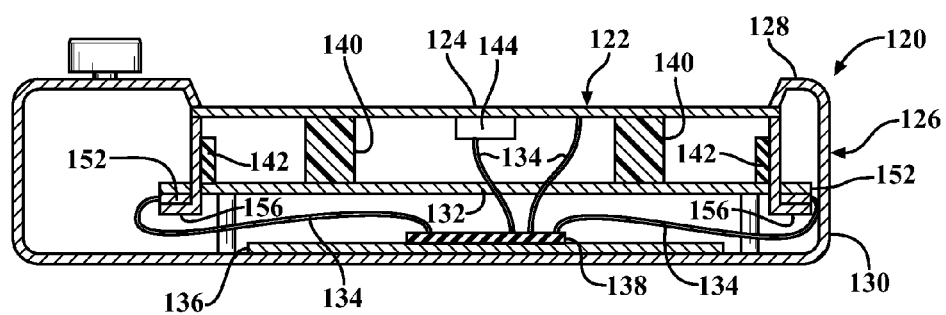
FIG. 5 is a cross-sectional view of an alternate exemplary embodiment of the touch assembly.
Figure 6:
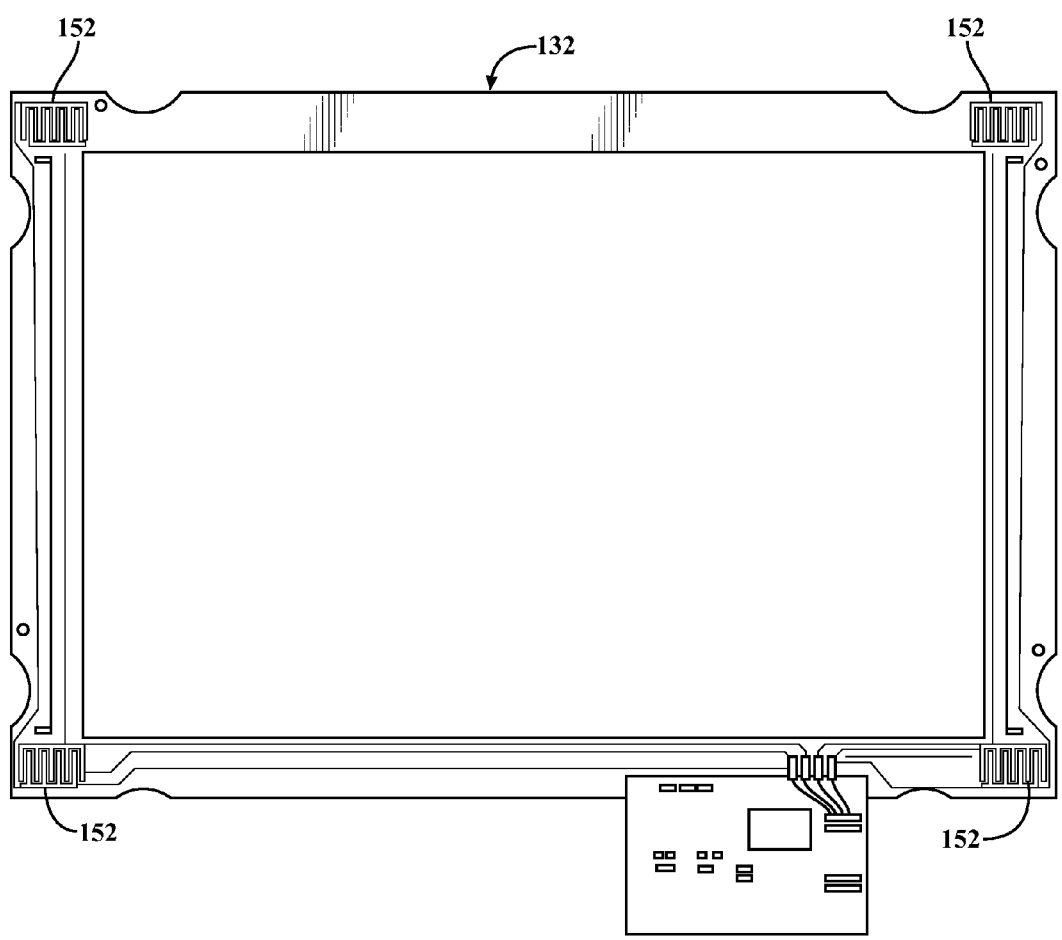
FIG. 6 is a perspective elevation view of a base and a plurality of switches of the alternate exemplary embodiment of the touch assembly.

Referring now to FIG. 5, an alternate embodiment of the touch assembly 120 is generally shown with like numerals separated by a factor of 100 indicating corresponding parts with the above-described embodiment. The second exemplary embodiment is similar to the first discussed above except the haptic feedback device 144 is a piezoelectric element 144 rather than the ERM vibrator 44 discussed above and the switches 152 are capacitive sensors 152 rather than the FSRs 52 discussed above. The piezoelectric element 144 is configured to expand or contract when an electrical current flows through it. Preferably, the microprocessor 138 is configured to send an alternating current through the piezoelectric element 144, which will cause it to expand and contract in a cyclical manner, thereby vibrating the touch screen monitor 122. Adjusting the amplitude and the frequency of the alternating current applied to the piezoelectric element 144 may also change the feel of the vibration to the person. Accordingly, the touch assembly 120 could be configured to provide one feedback when a person presses on a first location of the touch screen monitor 122 and a different feedback when a person presses on a different location of the touch screen monitor 122. The capacitive sensors 152 are configured to change capacitance in response to a change in the force applied by the plungers 156. In operation, the change in capacitance is measured by the microprocessor 138, which activates the piezoelectric element 144 to provide haptic feedback in response to the capacitance measured by the capacitive sensors 152 crossing a predetermined threshold capacitance. The thickness of the capacitive sensors 152 is exaggerated in FIG. 5 because, as shown in FIG. 6, the capacitive sensors 152 of this alternative embodiment are built into the base 132. It should be appreciated that the switches 52, 152 and the haptic feedback devices 44, 144 could be a range of different devices than those shown in exemplary embodiments.

Another aspect of the present invention is a method of operating a touch assembly 20, 120 having a touch surface and a haptic feedback device 44, 144 and at least one switch 52, 152 that is adjustable between an activated condition and a deactivated condition. The at least one switch 52, 152 is configured such that it is in the activated condition when no touch force is applied to the touch surface and adjusts to the deactivated condition in response to a touch force being applied to the touch surface. The method includes the step of monitoring the condition of the at least one switch 52, 152. The method continues with the step of receiving a touch force on the touch surface. The method then proceeds with the step of deactivating the switch 52, 152 in response to the touch surface receiving the touch force. The method continues with the step of activating the haptic feedback device 44, 144 to vibrate the touch surface in response to the switch 52, 152 deactivating. In other words, it is the deactivation, not activation, of the at least one switch 52, 152 that triggers the activation of the haptic feedback device 44, 144. The switch or switches 52, 152 could be FSRs 52, capacitive sensors 152 or any desirable types of switches. The haptic feedback device 44, 144 could be an ERM vibrator 44, a piezoelectric element 144 or any desirable type of haptic feedback device or driver.

The method may proceed with the steps of adjusting the monitoring of the at least one switch 52, 152 in response to the at least one switch 52, 152 being in the deactivated condition to prevent continued deactivation of the at least one switch 52, 152 by the haptic feedback device 44, 144. In other words, the touch assembly 20, 120 automatically prevents the haptic feedback device 44, 144 from entering a loop where it activates itself by deactivating the switch 52, 152.

In one embodiment, this is accomplished by delaying the monitoring of the at least one switch 52, 152 for a duration that is greater than the duration of the activation of the haptic feedback device 44, 144. For example, if the haptic feedback device 44, 144 is configured to activate for a quarter of a second in response to the switch 52, 152 adjusting to the deactivated configuration, then the touch assembly 20, 120 automatically stops monitoring the condition of the at least one switch 52, 152 for more than a quarter of a second before continuing normal monitoring of the condition of the at least one switch 52, 152.

In another embodiment, preventing the self-activation of the haptic feedback device 44, 144 is accomplished by delaying the monitoring of the at least one switch 52, 152 until a predetermined number of vibrations are measured. For example, if the haptic feedback device 44, 144 is configured to activate for twenty cycles, then the touch screen assembly counts the cycles and automatically stops monitoring the condition of the at least one switch 52, 152 until after the twenty cycles have been counted.

In yet another embodiment, preventing the self-activation of the haptic feedback device 44, 144 is accomplished by measuring a signal produced by the switch 52, 152 and allowing the haptic feedback to be reactivated only after the signal produced by the at least one switch 52, 152 crosses a predetermined threshold. For example, if the at least one sensor is a force sensitive resistor, then the touch screen assembly may automatically stop monitoring the condition of the at least one force sensitive resistor until its resistance falls below a predetermined level.

Yet another aspect of the present invention is also related to a method of operating a touch assembly 20, 120 having a touch screen, a base 32, 132, a haptic feedback device 44, 144 and at least one switch 52, 152. The at least one switch 52, 152 is adjustable between an activated configuration and a deactivated configuration and is biased into the activated configuration. The method continues with the step of receiving a touch force on the touch surface to move the touch surface. The method proceeds with sensing the location of the touch force on the touch surface. The method further includes the step of adjusting the at least one switch 52, 152 to the deactivated configuration in response to the touch surface moving relative to the base 32, 132. The method continues with the step of transmitting a signal only in response to the location of the touch force being sensed and the at least one switch 52, 152 being in the deactivated condition. The signal transmitted by the touch assembly 20 could be, for example, to trigger a haptic feedback device 44, 144 or to accomplish any desirable action. This is beneficial because it protects against unintended actuation of the touch assembly 20, 120. For example, if the touch assembly 20, 120 is vibrated, the at least one switch 52, 152 might deactivate, but the touch assembly 20, 120 would not actuate because no location of a touch force would be sensed. Alternately, if a person accidentally brushed the touch surface, a location would be sensed, but the touch assembly 20, 120 would not actuate because the at least one switch 52, 152 would not deactivate.

While the invention has been described with reference to an exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of operating a touch assembly having a touch surface and a haptic feedback device and at least one switch, comprising the steps of:
   monitoring the at least one switch to determine whether it is in an activated condition indicating no touch force is being applied to the touch surface or a deactivated condition indicating a touch force is being applied to the touch surface;
   receiving a touch force on the touch surface;
   deactivating the switch in response to the touch surface receiving the touch force;
   activating the haptic feedback device to vibrate the touch surface in response to the switch deactivating; and
   adjusting the monitoring of the at least one switch in response to the at least one switch being in the deactivated condition to prevent continued deactivation of the at least one switch by the haptic feedback device.

2. The method as set forth in claim 1 wherein the step of activating the haptic feedback device is for a predetermined duration and wherein the step of adjusting the monitoring of the at least one switch is further defined as delaying monitoring of the at least one switch for a greater duration than the predetermined duration.

3. The method as set forth in claim 1 wherein the step of activating the haptic feedback device is for a predetermined number of cycles and further including the step of counting the cycles from the haptic feedback device and wherein the step of adjusting the monitoring of the switch is further defined as delaying monitoring of the at least one switch until the predetermined number of cycles are counted.

4. The method as set forth in claim 1 wherein the step of adjusting the monitoring of the at least one switch is further defined as measuring a signal produced by the switch and only allowing the haptic feedback device to be re-activated after the signal produced by the at least one switch crosses a predetermined threshold.

5. A method of operating a touch assembly having a touch surface and a base and a haptic feedback device and at least one switch adjustable between an activated configuration and a deactivated configuration and wherein the at least one switch is biased into the activated configuration, comprising the steps of:
   receiving a touch force on the touch surface to move the touch surface relative to the base;
   sensing the location of the touch force on the touch surface;
   adjusting the at least one switch to the deactivated configuration in response to the touch surface moving relative to the base;
   transmitting a signal only in response to the location of the touch force being sensed and the at least one switch being in the deactivated configuration;
   activating the haptic feedback device to vibrate the touch surface in response to the switch deactivating in response to the switch being in the deactivated configuration; and
   adjusting the transmitting of the signal in response to the at least one switch being in the deactivated configuration to prevent continued deactivation fo the at least one switch by the haptic feedback device.

6. The method as set forth in claim 5 further including a haptic feedback device and wherein the signal activates the haptic feedback device to vibrate the touch surface.

7. The method as set forth in claim 6 wherein the haptic feedback device is an eccentric rotating mass vibrator.

8. The method as set forth in claim 6 wherein the haptic feedback device is a piezoelectric element.

9. The method as set forth in claim 5 wherein the at least one switch is at least one force sensitive resistor.

10. The method as set forth in claim 9 wherein the step of adjusting the at least one switch from the activated configuration to the deactivated configuration is further defined as opening an electrical circuit.

11. The method as set forth in claim 5 wherein the at least one switch is a capacitive sensor.

12. The method as set forth in claim 11 wherein the step of adjusting the at least one switch from the activated configuration to the deactivated configuration is further defined as changing the capacitance of the capacitive sensor.

\* \* \* \* \*